Oct. 27, 1936.            A. WHITAKER ET AL            2,059,159
                          VIBRATORY MIRROR SYSTEM
                            Filed July 2, 1931

INVENTORS:
Alfred Whitaker,
Cecil Oswald Browne,
BY
THEIR ATTORNEY.

Patented Oct. 27, 1936

2,059,159

UNITED STATES PATENT OFFICE 2,059,159

VIBRATORY MIRROR SYSTEM

Alfred Whitaker, West Drayton, and Cecil Oswald Browne, London, England, assignors to Electric and Musical Industries Limited, Middlesex, England, a company of Great Britain Application July 2, 1931, Serial No. 548,306
In Great Britain July 3, 1930

5 Claims. (Cl. 178—6)

The present invention relates to vibratory mirror systems for use, for example, in sound recording. The invention is also applicable for scanning purposes in television, picture telegraphy and like systems.

It is an object of the present invention to provide a simple and efficient mirror mounting.

According to the present invention, a mirror, which is adapted to oscillate under the influence of electric current oscillations, is mounted upon an armature which is carried by a torsion member adapted to twist when the armature vibrates, the armature co-operating with magnet poles placed symmetrically with respect to the axis of vibration of the armature.

The invention will be described with reference to the accompanying drawing, in which:—

Figure 1:
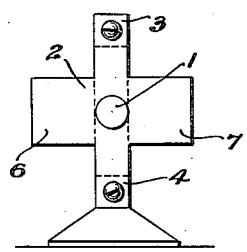
Fig. 1 is a detailed view, in front elevation, of the mirror and its mounting.
Figure 2:
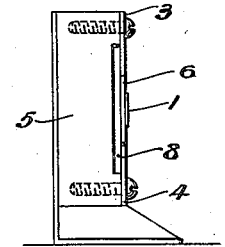
Fig. 2 is a side elevation of the apparatus of Fig. 1.

Referring now to Figures 1 and 2, a suitable light reflector such as a mirror 1 is mounted upon the center of a metal plate 2 which is in the form of a cross. The ends 3 and 4 of one arm of the cross are screwed upon a mounting plate 5, while the free ends 6 and 7 of the other arm of the cross, which henceforth will be called the armature, are adapted to move between magnet poles. In order that the mirror may be free to rotate, a recess 8 is cut in the mounting plate 5.

Figure 3:
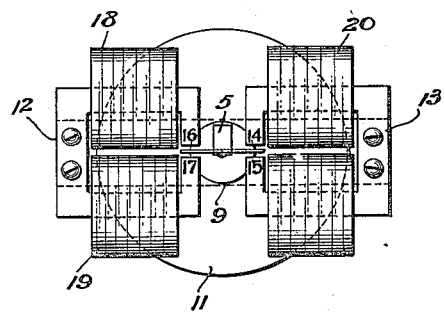
Figs. 3 and 4 are views in plan and elevation, respectively, of the mirror mounting together with the magnet poles and their associated coils.
Figure 4:
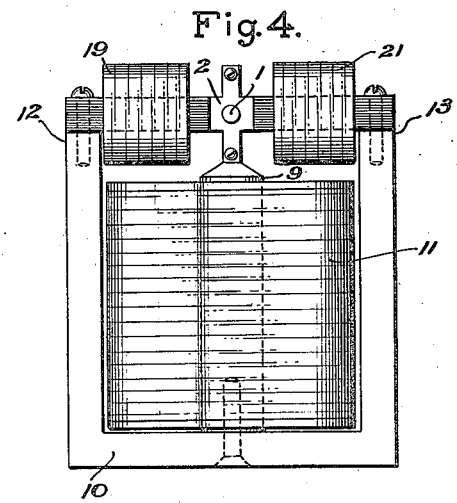

The mirror mounting, which is shown in detail in Figs. 1 and 2, is associated with electromagnets as illustrated in Figs. 3 and 4. The mounting plate 5 is mounted upon a cylindrical metal rod or post 9 which is screwed to a supporting yoke 10. The rod 9 is surrounded by a coil 11 through which a small constant current is maintained, and therefore the metal plate 2 is polarized to a constant degree. Upon the two ends 12, 13 of the yoke 10 are screwed laminated pole pieces which are in the form of symmetrically disposed pairs of poles 14, 15 and 16, 17. The lines of force due to the current passing through the coil 11 thus pass from the armature 6, 7 through the rod 9, the support or yoke 10, the poles 14, 15 and 16, 17, across the air gap between these poles and back to the armature 6, 7.

If, now, it be desired to oscillate the mirror in accordance with speech currents, the latter are passed through four coils 18, 19, 20, 21 in such manner that when the strength of the poles 15 and 16 is increased, that of the poles 14 and 17 is decreased, and vice versa.

It will be apparent that the magnetic poles 14, 15, 16, 17 must be symmetrically disposed with respect to the axis of the arm 3, 4, of the cross, for in this way the forces applied to each end of the armature 6, 7 can be made equal and opposite in sense so that there will be no motion of the mounting other than a rotational motion. The restoring force opposing the rotational motion is that due to the torsion in the arm 3, 4 of the cross 2.

Many modifications may be made to the construction described above, which lie within the scope of the invention. For example, it is not necessary that the end 3 of the vertical arm of the cross should be clamped to the mounting plate 5, and thus, by adding weights to this free end 5, the natural frequency of the mirror mounting may be altered. The same effect may be obtained by making the point or points of attachment of the arm 3, 4 to the mounting plate 5 adjustable in position along the axis of that arm.

As used for the purposes of sound recording, electrical oscillations corresponding to the sound to be recorded are passed around the coils of the pole pieces which cooperate with the armature, and a beam of light is reflected from the mirror onto a moving light-sensitive film in known manner.

Where the device is used for scanning purposes, electrical oscillations of scanning frequency are passed through the coils. Two vibratory devices of the type described may be used, the axes of the devices being disposed at right angles to one another. The scanning beam is then reflected from one mirror onto the other.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. A reflector mounting comprising a mounting plate and a cross-shaped armature mounted on one surface thereof for torsional movement, the arms of the cross all lying in substantially the plane of said surface and said plate being recessed opposite the intersecting portion of said arms, said armature having the ends of one pair of its arms adjustably fixed to said plate and having the other pair of its arms freely suspended, whereby torsional movement may be imparted to said armature about its fixed ends.

2. In combination, a support, a post on said support, a magnetic armature mounted on said post and having a pair of oppositely disposed free arms, a pair of pole pieces mounted on said support, each of said pole pieces comprising a pair of oppositely disposed poles and receiving one of said free arms between the poles thereof, a coil about said post for maintaining a constant flow of magnetic flux through a magnetic circuit including said armature whereby to polarize said armature, and a magnetic coil system about said pole pieces for influencing the position of said armature in accordance with current flowing therethrough.

3. In a system for recording signals by means of light, a support, a post on said support, a mounting plate on said post, a magnetic armature mounted on said plate for torsional movement, a coil about said post for polarizing said armature, a light reflecting member on said armature, a pair of pole pieces mounted on said support, each comprising a pair of oppositely disposed poles and receiving one end of said armature between the poles thereof, and a coil system about said pole pieces for magnetically effecting torsional movement of said armature in accordance with signal currents flowing through said coil system.

4. In a system for recording signals by means of light, a support, a post on said support, a mounting plate on said post forming an extension thereof, an armature mounted on said plate for torsional movement about an axis substantially in alignment with the axis of said post, and a light reflecting member mounted on said armature along the vibratory axis thereof.

5. In a system for recording signals by means of light, a support, a post on said support, a mounting plate on said post in axial alignment therewith, an armature mounted on said plate for torsional movement about an axis substantially in alignment with the axis of said post, and a light reflecting member mounted on said armature along the vibratory axis thereof.

ALFRED WHITAKER.
CECIL OSWALD BROWNE.